United States Patent [19]

Montaser et al.

[11] Patent Number: 4,833,294

[45] Date of Patent: May 23, 1989

[54] INDUCTIVELY COUPLED HELIUM PLASMA TORCH

[75] Inventors: Akbar Montaser, Potomac, Md.; Shi-Kit Chan, Washington, D.C.; Raymond L. Van Hoven, Alexandria, Va.

[73] Assignee: Research Corporation, Tucson, Ariz.

[21] Appl. No.: 158,030

[22] Filed: Feb. 12, 1988

Related U.S. Application Data

[63] Continuation of Ser. No. 902,256, Aug. 29, 1986, abandoned.

[51] Int. Cl.[4] .......................... B23K 9/00; H05H 1/30

[52] U.S. Cl. .......................... 219/121.52; 219/121.51; 219/121.48; 219/121.49; 315/111.51

[58] Field of Search ...... 219/121 P, 121 PR, 121 PQ, 219/121 PP, 121 PM; 313/231.37, 231.41, 231.51; 315/111.51, 111.21

[56] References Cited

U.S. PATENT DOCUMENTS

| | | | |
|---|---|---|---|
| 3,450,926 | 6/1969 | Kiernan | 219/121 PN |
| 3,892,882 | 7/1975 | Guest et al. | 219/121 PQ |
| 4,266,113 | 5/1981 | Denton et al. | 219/121 PQ |
| 4,306,175 | 12/1981 | Schleiche et al. | 315/111.51 |
| 4,386,258 | 5/1983 | Akashi et al. | 219/121 PR |
| 4,482,246 | 11/1984 | Meyer et al. | 315/111.51 |
| 4,575,609 | 3/1986 | Fassel et al. | 219/121 PR |
| 4,578,560 | 3/1986 | Tanaka et al. | 219/121.51 |

FOREIGN PATENT DOCUMENTS

| | | | |
|---|---|---|---|
| 3130908 | 3/1983 | Fed. Rep. of Germany | 315/111.51 |
| 0872104 | 10/1981 | U.S.S.R. | 219/121 PQ |

OTHER PUBLICATIONS

Chan, S. et al., *Spectrochimica Acta.* 40B No. 10–12, pp. 1467–1472 (1985).
Montasser, A. et al., 27th Rocky Mountain Conference, Jul. (1985).
Chan, S. et al., 1985 FACSS, Sep.—Oct. (1985).
Chan, S. Department of Chemistry Seminar, George Washington University, Oct. 4, 1985.
Montasser, A. et al., 1986 Winter Conference on Plasma Spectrochemistry, Jan. 2–8, 1986.
Chan, S. et al., Pittsburgh Conference and Exposition (Atlantic City, N.J.), Mar. 13, 1986.
Wolnik, K. A., et al., *Applied Spectroscopy* 39, pp. 930–935 (1985).
Smith, T. R. et al., *Spectrochimica Acta.* 40B, No. 9, pp. 1227–1237 (1985).
Abdallah, M. H. et al., *Spectrochimica Acta.* 37B, No. 5, pp. 391–397 (1982).
Robin, J. P. *Prog. Analyt. Atom. Spectrosc.* 5, pp. 79–110 (1982).
Seliskar, C. J. et al., *Applied Spectroscopy* 39, pp. 181–183 (1985).

*Primary Examiner*—M. H. Paschall
*Attorney, Agent, or Firm*—Scully, Scott, Murphy & Presser

[57] ABSTRACT

An inductively coupled plasma torch including a base member, a plasma tube and a threaded insert member within the plasma tube for directing the plasma gas in a tangential flow pattern. The design of the torch eliminates the need for a separate coolant gas tube. The torch can be readily assembled and disassembled with a high degree of alignment accuracy.

12 Claims, 2 Drawing Sheets

INDUCTIVELY COUPLED HELIUM PLASMA TORCH

This application is a continuation, of application Ser. No. 902,256, filed Aug. 29, 1986.

TECHNICAL FIELD

This invention relates to an inductively coupled plasma torch, and more particularly, to torch designs that reduce the total plasma gas flow, allow direct generation of helium plasmas at atmospheric pressure, improve analytical performance and facilitate maintenance.

PRIOR ART

In analytical spectroscopy and other applications, it is often desirable to employ an inductively coupled plasma (ICP) torch as a vaporization-atomization-excitation-ionization source. Since the introduction of the ICP for analytical spectroscopy, the argon ICP has been widely used as a valuable plasma source for trace analysis. Research groups have attempted to utilize helium as the plasma gas source but it was not until recently, (Chan, S. and Montaser, A; Spectrochimica Acta Vol. 40B, 1985, Nos. 10–12, pp. 1467–1472) that helium ICPs were generated which did not require a mixture of other gases such as Ar and air to achieve plasma stability at atmospheric pressure. An annular ICP is formed in the presence of an injector gas while a filament ICp is formed when no injector gas is used. The annular helium ICP described in said reference requires a high gas flow (57 L/min He) and a relatively complicated procedure for generation of plasma involving transformation of an argon ICP to a helium ICP.

The above limitations at atmospheric pressure have been circumvented by the use of reduced-pressure helium ICPs, especially for the determination of non-metals. However, the applications of these reduced-pressure helium ICPs are limited to gas analysis. Analysis of aqueous samples with a needle-type helium ICP operated at atmospheric pressure has been unsuccessful due to inefficient sample-plasma interaction.

U.S. Pat. No. 4,482,246 describes an ICP for elemental analysis of injected aerosol or powdered samples utilizing non-argon gas as the plasma source at atmospheric pressure. The apparatus comprises a plasma discharge containment tube, a coaxial intermediate tube and a coaxial central tube which are held in place by O-rings. This configuration cannot sustain a pure helium ICP.

A high frequency ICP torch is described in U.S. Pat. No. 4,578,560 wherein a one-piece multi-pipe structure is employed to facilitate introduction of the plasma gas, cooling gas, and injector gas. This arrangement also creates a dead volume wherein the plasma gas collects. With this torch, a low-gas-flow helium ICP cannot be formed.

An argon ICP torch apparatus is presented in U.S. Pat. No. 4,266,113 which allows concentric alignment of coolant, plasma and injector gas tubes while being demountable. The coaxial tubes are held in place by spacer rings. The coolant gas is directed in a tangential flow by a slanted channel in the first spacer ring. The plasma gas is directed in a laminar flow by a transverse channel means in a second spacer ring. Also with this torch, a low-gas-flow helium ICP cannot be formed.

Each of the ICP torches described in the above patents have three tube configuration for the torch thereby requiring three gas flows for plasma formation and stabilization.

SUMMARY OF THE INVENTION

The present invention relates to a demountable, low-gas-flow torch for generating a helium ICP at atmospheric pressure. The torch comprises a threaded insert member within a plasma tube for directing the plasma gas in a tangential flow pattern and for direction the injector gas in a laminar flow pattern.

The construction of the threaded gas insert allows use of reduced flow of plasma gas which is confined and directed with the absence of dead volume and eliminates the need for a separate coolant gas tube.

The torch can be readily assembled and disassembled with a high degree of alignment accuracy. In one embodiment of the invention the insert member is made readily demountable by use of O-rings as a means for holding the insert in place within the torch base.

In a preferred embodiment the ICP is constructed for use with helium as the plasma gas. The torch allows generation of helium ICPs directly from helium gas. In principle, the use of a helium ICP should facilitate the determination of every element, except, helium, in the periodic table. Since the ionization energy of helium is greater than that of argon and other gases, a helium ICP should be a more efficient plasma source than an argon ICP and other non-argon ICPs. In particular, elements such as halogens, arsenic, bismuth, nitrogen, oxygen, phosphorus, sulfur, tellurium and tin should be excited and ionized more efficiently in the helium ICP.

BRIEF DESCRTIPION OF THE DRAWINGS

DETAILED DESCRIPTION OF THE INVENTION

The present invention relates to an ICP wherein the required plasma gas flow is substantially reduced by the configuration of the plasma gas passageway. The torch has no dead volume thereby minimizing turbulence effects. A pure helium ICP can be generated directly in this torch.

Figure 1:
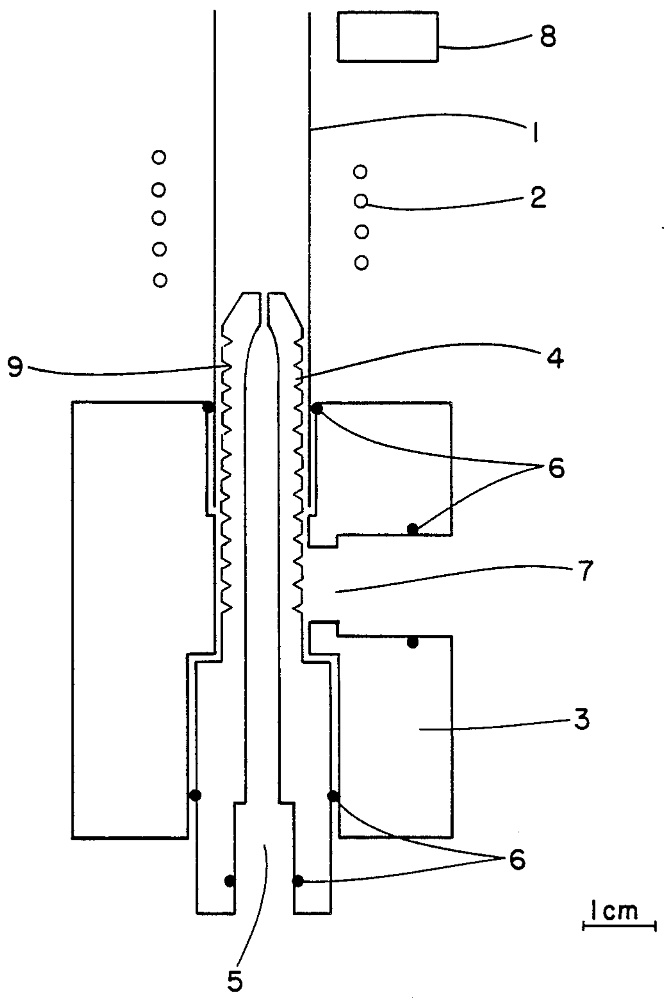
FIG. 1 is a schematic diagram of the assembled low-gas-flow torch of the present invention.
Figure 2:
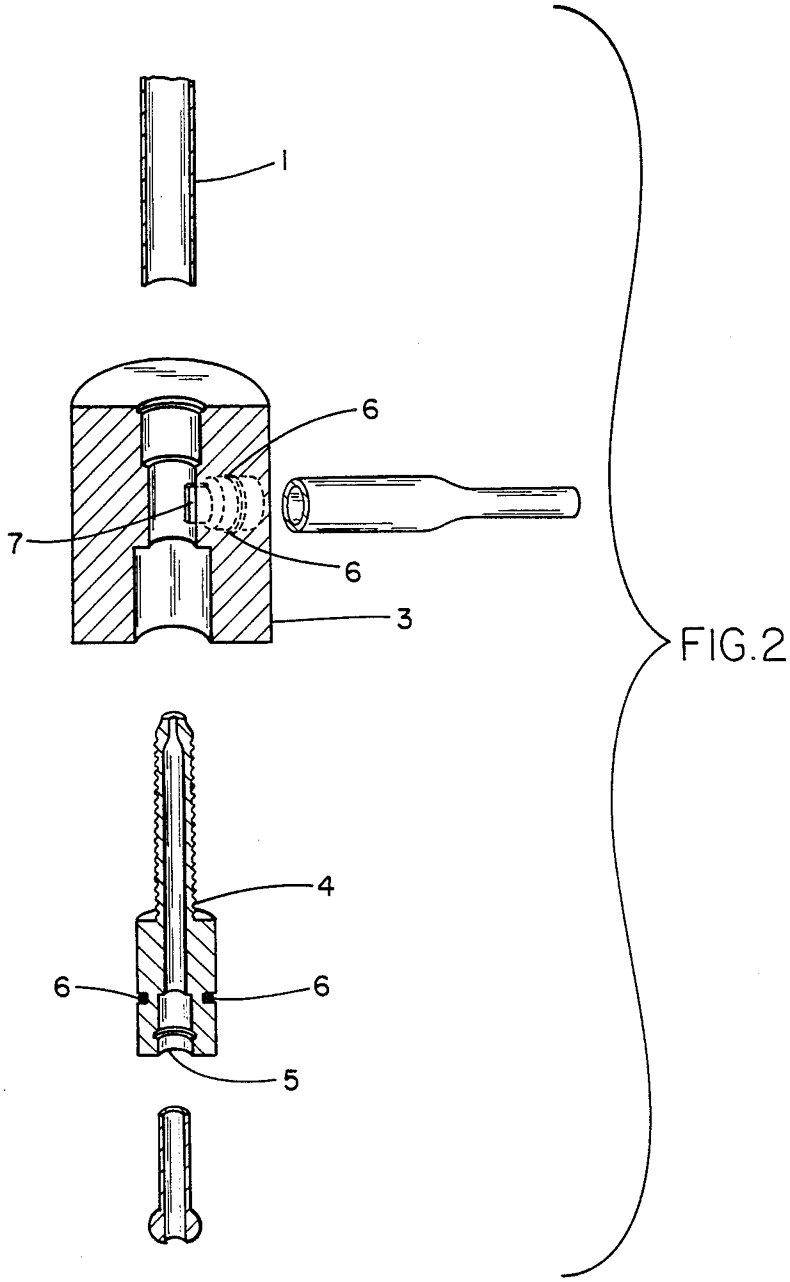
FIG. 2 is a schematic diagram of the disassembled low-gas-flow torch of the present invention.

Referring now to FIG. 1, the inductively coupled plasma torch of the present invention comprises a plasma tube 1 for confining and directing gas flows within an electromagnetic field produced by a load coil 2. The gas flows contain a sample of interest for analysis thereof. The ICP further comprises a base member 3 to receive the plasma. tube 1 and an exteriorly threaded insert member 4. The insert member is constructed so as to fit flush within the plasma tube 1. The threads of the insert member 4 provide a passageway for the plasma gas which imparts a tangential flow to the plasma gas. The plasma gas thereby surrounds and directs the injector gas and samples of entering the torch via a coaxially aligned injector gas port 5 within the plasma tube 1.

Sample can also be introduced via the tangential gas flow through the rectangular slot 7 thereby forming a filament-type ICP.

The torch can be constructed to be easily demountable. In a preferred embodiment O-rings 6 are used to provide a means of securing the threaded insert 4 within the plasma tube 1.

In a preferred embodiment, the present invention relates to a filament or annular helium ICP. The torch cnsists of three components: a torch base 3, a threaded insert 4 and a high precision quartz tube (13 mm i.d. commercially available from Wilmad Buena, NJ), which are closely fitted together by means of nitrile O-rings commercially available from Parker of Lexington, KY. The torch base and threaded insert are made of MACOR machineable glass ceramics commercially available from Corning Glass Works of Corning, NY. High purity 99.997% helium gas was introduced into the plasma gas passageways 9 via the torch base 3 through a rectangular slot 7 measuring 1.5 mm×9 mm. Each of the four quadra-threads traverse the passageway providing entry points in the plasma gas passageways 9. The injector gas, when used, was directed through an 0.5 mm orifice at the center of the insert. Liquid sample is introduced as an aerosol produced by an ultrasonic nebulizer as described in the article by Chan, S. and Montaser, A. Spectrochem. Acta 1985, 40B, 1467-1472. When an aerosol of liquid sample is transported by the injector gas into the torch an annular helium ICP is formed. Alternatively samples can be introduced via the tangential plasma gas inlet in the absence of injector gas thereby producing a filament-type ICP.

The detection system 8 consists normally of a photon detector (Chan, S. and Montaser, A; spectrochimica Acta Vol. 40B, 1985, Nos. 10-12, pp. 1467-1472) or a mass analyzer (R. S. Houk, et al. Anal. Chem. 1980 Vol. 52, pp. 2283-2289). The detection systems 8 of FIG. 1 may alternatively be placed above the plasma tube 1. In the preferred embodiment, the detection system 8 consists of a 1024-element intensified (700 active element) linear photodiode array detector (Model 1420 R, E. G. & G. Princeton Applied Research, Princeton, NJ) with a detector module and a system processor (Models 1463 and 1460). The described detection system is used to monitor atomic emission of Br I 827.24 nm. The diode array detector is cooled to −5° C. and scans repetitively 100 times at a rate of 100 ms/scan for each signal integration. Possible interference from second or third order spectra is eliminated by use of a sharp-cut-off, red filter commercially available from Corning Glass works of Corning, NY. The entrance slit of the monochromator is set at 50 um.

MACOR machineable glass ceramics are chosen for constructing the torch base and the threaded insert because of its excellent electrical resistivity, thermal shock resistance, zero porosity, chemical resistance and machineability. Due to the high precision achievable with the MACOR ceramics the torch can be constructed to be easily assembled or disassembled within a minute with no need for further alignment. The torch is designed with an absence of dead volume thereby minimizing turbulence.

The most critical parameters in the design are the groove's geometry and the dimensions of the threaded insert which determine the flow pattern and total gas flow for sustaining the helium ICP. The insert is quadra-threaded at 1.54 pitch per cm and the dimensions of the v-shaped groove are 1.17 and 0.45 mm for the width and the depth, respectively. The parameters of the threaded insert member were chosen to achieve the desired flow rate for the plasma gas through the ICP.

The helium ICP as 1500 W forward power and 5 W reflective power. The plasma gas flow and injector gas flow for the annular helium ICP are 7 and 1 l/min, respectively. In most cases the plasma was self-ignited to form a very stable helium ICP. The flow path of the helium plasma gas provides sufficient cooling of the torch assembly so that no external cooling means is required. The sample uptake rate is 2 ml/min.

Determinations of non-metals in aqueous and gaseous solutions are used to evaluate the analytical performance of the annular helium ICP. The signal-to-background (S/B) ratio, relative standard deviation (RSD) of the background intensities and detection limit (DL) of these results are listed in Tables 1 and 2. The highest S/B ratio is obtained at an observation height of 25 mm above the load coil.

TABLE 1

(Aqueous Samples)

| Element | helium ICP S/B | helium ICP DL (μg/ml) | helium ICP % RSD | argon ICP S/B | argon ICP DL (μg/ml) | argon ICP % RSD |
|---|---|---|---|---|---|---|
| Br (at wavelength 827.24 nm) | 13 | 5 | 4 | .2 | 26 | .3 |
| Cl (at wavelength 837.59 nm) | 5 | 9 | 3 | .6 | 20 | .8 |
| I (at wavelength 804.37 nm) | 2 | 18 | 2.5 | .1 | 82 | .6 |

Table 1 shows the (S/B) ratios, the detection limits (DL) and % relative standard deviation for chlorine, bromine and iodine when aqueous samples are introduced into the low-gas-flow helium ICP and the conventional argon ICP. The signal to background ratio for the above elements obtained with the helium ICP are 8 to 65 times higher than those of the argon ICP.

Detection Limits measured for the above non-metals were improved in the helium ICP by a factor of 2 to 6. These enhancements might be attributed to the higher excitation energy, lower background continuum and minimal spectral interference of the helium ICP compared to the argon ICP.

TABLE 2

(Gaseous Samples)

| Element | helium ICP S/B | helium ICP DL (μg/ml) | helium ICP % RSD | argon ICP S/B | argon ICP (μg/ml) | argon ICP % RSD |
|---|---|---|---|---|---|---|
| Br (at wavelength 827.24) | 120 | 1 | .7 | .83 | 53 | .2 |
| Cl (at wavelength 837.59) | 140 | .8 | 1.5 | 1.9 | 19 | .4 |
| C (at wavelength 833.51) | 13 | 2.2 | 1.2 | .04 | 240 | .3 |

Table 2 lists the results for gaseous bromine, chlorine and carbon in the helium and argon ICP. The signal to background ratio for the gaseous bromine, chlorine and carbon obtained with the helium ICP are superior to those of the argon ICP by a factor of 70 to 330. The detecting powers of the helium ICP are about 20 to 100 times superior to those of the argon ICP.

For introduction of gaseous samples the injector gases are replaced with 93 μl/l of $CH_3Cl$ or 99 μl of $CH_3Br$ in helium and 107 μl/l of $CH_3Cl$ or 108 μl/l $CH_3Br$ in argon for the helium ICP and argon ICP respectively.

Comparison of the herein described helium ICP with an argon ICP indicate that the annular helium ICP is a more efficient excitation source for non-metals than the argon ICP. In particular for Br, the S/B ratio is 13 for the helium ICP and 0.2 for the argon ICP, the S/N ratio is 323 for the helium ICP and 57 for the argon ICP; and the DL was 5 μg/ml for the helium ICP and 26 μg/ml for the argon ICP. The % RSD of 4 for the helium ICP is inferior relative to a 0.3% RSD for the argon ICP. This parameter has been improved by increasing the forward power or totally eliminating water from the aqueous sample before introducing the aerosol into the plasma. The RSD of the background intensities can be reduced to less than 1% for gaseous samples. The detection limit is defined as the concentration giving a signal equivalent to three times the standard deviation of eleven repetitive measurements of the background intensity.

While illustrative embodiments of the subject invention have been described and illustrated, it is obvious that changes and modifications can be made therein without departing from the spirit of the present invention which should be limited only by the scope of the appended claims.

We claim:

1. An annular inductively coupled helium plasma torch, which comprises:

(a) a non-threaded plasma tube for confining and directing a gas flow within an electromagnetic field produced by a load coil, said gas flow having a sample of interest contained therein for the analysis thereof in the presence of the electromagnetic field;

(b) a base member, said base member adapted to receive said plasma tube;

(c) an exteriorly threaded insert member, wherein said exterior threads define a helium plasma gas passageway between said member and said tube, said insert member adapted to fit flush within said plasma tube, said insert member having a tapered tip to direct said plasma gas, said insert member also defining a gas port axially aligned within said plasma tube; and (d) a first means for supplying a helium plasma gas to the plasma gas passageway and a second means for supplying an injector gas and samples of interest to said gas port whereby the pitch of the thread of the insert member imparts a tangential flow to said plasma gas to surround the injector gas and samples of interest contained therein.

2. A filament-type inductively coupled helium plasma torch, which comprises:

(a) a non-threaded plasma tube for confining and directing a gas flow within an electromagnetic field produced by a load coil, said gas flow having a sample of interest contained therein for the analysis thereof in the presence of the electromagnetic field;

(b) a base member, said base member adapted to receive said plasma tube;

(c) an exteriorly threaded insert member, wherein said exterior threads define a plasma gas passageway between said member and said tube, said insert member adapted to fit flush within said plasma tube, said insert member having a tapered tip to direct said plasma gas; and (d) means for supplying a helium plasma gas and samples to the plasma gas passageway whereby the pitch of the thread of the insert member imparts a tangential flow to said plasma gas to direct the samples of interest within said electromagnetic field.

3. The inductively coupled helium plasma torch of claim 1 or 2 wherein the load coil is loaded with radio frequency energy.

4. The inductively coupled helium plasma torch of claims 1 or 2 wherein the plasma tube is constructed of quartz, and the torch base and the threaded insert member are constructed of glass ceramics.

5. The inductively coupled helium plasma torch of claim 4 wherein the threaded insert member is quadra-threaded.

6. The inductively coupled helium plasma torch of claim 5 wherein the quadra-threaded insert member has a 1.54 pitch per cm and 1.17 mm width, 0.45 m depth V-shaped grooves.

7. The inductively coupled helium plasma torch of claim 1 or 13 wherein the plasma gas is supplied perpendicular to the plasma tube.

8. The inductively coupled helium plasma torch of claim 7 wherein the plasma gas is supplied through a 1.5 mm×9 mm rectangular slot formed in said base member.

9. The inductively coupled helium plasma torch of claim 1 wherein the total gas flow through the torch is less than 10 L/min.

10. An inductively coupled helium plasma torch, which comprises:

(a) a non-threaded plasma tube for configuring and directing a gas flow within an electromagnetic field produced by a load coil, said gas flow having a sample of interest contained therein for the analysis thereof in the presence of the electromagnetic field;

(b) a base member, said base member adapted to receive said plasma tube;

(c) an exteriorly threaded insert member, wherein said exterior threads define a plasma gas passageway between said member and said tube, said insert member adapted to fit flush within said plasma tube, said insert member having a tapered tip to direct said plasma; and (d) a first means for supplying a helium plasma gas to the plasma gas passageway whereby the pitch of the thread of the insert member imparts a tangential flow to said plasma gas to direct the samples of interest and a second means for supplying samples of interest to the plasma tube.

11. The inductively coupled helium plasma torch of claim 10 wherein said insert member also defines a gas port axially aligned within said plasma tube for supplying an injector gas and the samples of interest to the plasma tube whereby an annular inductively coupled plasma torch is produced.

12. The inductively coupled helium plasma torch of claim 10 wherein said first means for supplying a helium plasma gas and said second means for supplying samples of interest are defined by a gas port perpendicular to said plasma tube whereby a filament-type inductively coupled plasma torch is produced.

* * * * *